United States Patent
Zeffiro et al.

(10) Patent No.: US 12,006,465 B2
(45) Date of Patent: Jun. 11, 2024

(54) EMULSIFIERS FOR WATER-BASED SUBTERRANEAN TREATMENT FLUIDS

(71) Applicant: LAMBERTI SPA, Albizzate (IT)

(72) Inventors: Alberto Zeffiro, Sugar Land, TX (US); Andrea Balestrini, Sugar Land, TX (US); Sama Nazar Makiah, Richmond, TX (US)

(73) Assignee: LAMBERTI SPA, Albizzate (IT)

( * ) Notice: Subject to any disclaimer, the term of this patent is extended or adjusted under 35 U.S.C. 154(b) by 0 days.

(21) Appl. No.: 18/249,658

(22) PCT Filed: Apr. 27, 2021

(86) PCT No.: PCT/EP2021/079767
§ 371 (c)(1),
(2) Date: Apr. 19, 2023

(87) PCT Pub. No.: WO2022/090283
PCT Pub. Date: May 5, 2022

(65) Prior Publication Data
US 2023/0383166 A1    Nov. 30, 2023

(30) Foreign Application Priority Data

Oct. 30, 2020   (IT) .................. 102020000025969

(51) Int. Cl.
*C09K 8/28*    (2006.01)
*C09K 8/86*    (2006.01)

(52) U.S. Cl.
CPC . *C09K 8/28* (2013.01); *C09K 8/86* (2013.01)

(58) Field of Classification Search
None
See application file for complete search history.

(56) References Cited

U.S. PATENT DOCUMENTS

| 3,150,085 A * | 9/1964 | Mallory ............... C09K 8/28 |
| | | 507/116 |
| 2023/0272267 A1* | 8/2023 | Phatak ................ C09K 8/68 |
| | | 166/280.2 |

FOREIGN PATENT DOCUMENTS

| WO | 200114313 A1 | 3/2001 |
| WO | 2012061093 A1 | 5/2012 |
| WO | 2022090283 A1 | 10/2021 |

OTHER PUBLICATIONS

International Search Report and Written Opinion from corresponding PCT application PCT/EP2021/079767 mailed Feb. 28, 2022.

* cited by examiner

*Primary Examiner* — John J Figueroa
(74) *Attorney, Agent, or Firm* — Vorys, Sater, Seymour and Pease, LLP

(57) ABSTRACT

The present invention relates to a water-based subterranean treatment fluid, comprising: a) a continuous aqueous phase; b) an internal oil phase; c) from 0.1 to 15 g/100 ml, based on the total fluid volume, of an emulsifying composition comprising a first surfactant having a HLB from 10 to 20 and a second surfactant obtained by reacting a saturated or unsaturated aliphatic monocarboxylic acid, ethylene oxide and a hydroxyalkylamine. The invention further relates to a method for treating a subterranean formation comprising providing said water-based subterranean treatment fluid.

8 Claims, No Drawings

EMULSIFIERS FOR WATER-BASED SUBTERRANEAN TREATMENT FLUIDS

TECHNICAL FIELD

The present invention relates to emulsifiers for water-based subterranean treatment fluids with improved stability and environmental compatibility.

Subterranean treatments fluids are meant to include drilling and completion fluids, as well as other fluids used in subterranean operations such as stimulation fluids, etc.

BACKGROUND OF THE ART

Various types of subterranean treatment fluids, such as drilling fluids, are used in operations related to the development, completion, and production of natural hydrocarbon reservoirs.

These fluids may be classified according to their fluid base into two main categories: water-based treatment fluids, also known as water based muds (WBMs), in which the carrier is an aqueous medium; and oil-based treatment fluids, also known as oil-based muds (OBMs), in which the carrier is oil.

In particular, the water-based subterranean treatment fluids of the present invention are in the form of direct emulsions of oleaginous and aqueous fluids. Direct emulsion (also referred to as "oil-in-water emulsion" or "o/w emulsion"), as used herein, is an emulsion in which water is the continuous phase and an oleaginous phase is the internal discontinuous phase.

Emulsions are generally stabilized by addition of one or more emulsifiers, also referred to as emulsifying agents or emulsion stabilizing agents, which prevent the droplets coalescence, phase separations and the reduction of their performances.

When used in subterranean applications, emulsions undergo exceptional mechanical and thermal stress, and therefore stability is an especially critical aspect of their formulation.

Water-based muds have been less extensively studied and exploited than oil-based muds, because they are affected by some disadvantages such as their tendency to react with shale formations or lower penetration rate.

U.S. Pat. No. 3,150,085 describes an oil-in-water drilling fluids comprising a non-ionic emulsifier which is a polyoxyethylene ether of a partial ester of a low molecular weight polyhydroxylic compound and a higher carboxylic acid.

US 2017/0029687 relates to a direct emulsion fluid comprising a surfactant, which preferably is a phosphate blend and/or phospholipid surfactant.

WO 2019/066913 concerns a water-based drilling fluid, wherein the emulsifier is selected from the group consisting of fatty amines, ethoxylated nonylphenols, fatty acids, fatty acid esters, and combinations thereof.

Despite some emulsifiers and/or emulsifying systems suitable for water-based drilling fluids have been described, a need still exists in the art for emulsifiers that are suitable for obtaining thermally-stable water-based drilling fluids.

SUMMARY OF THE INVENTION

It is therefore an object of the present invention a water-based subterranean treatment fluid comprising:
a) a continuous aqueous phase
b) an internal oil phase
c) from 0.1 to 15 g/100 ml, based on the total fluid volume, of an emulsifying composition comprising: i) from 1 to 40 wt % of a first surfactant having a HLB from 10 to 20 and ii) from 10 to 90% of at least one second surfactant obtained by reacting from 0.8 to 1.2 moles of a saturated or unsaturated $C_6$-$C_{30}$ aliphatic monocarboxylic acid, from 1 to 20 of ethylene oxide and from 0.8 to 1.2 moles of a hydroxyalkylamine of Formula (I)

wherein:
R is $C_2$-$C_4$-alkylene,
X and Y are selected among H, ($C_2$-$C_4$-alkylene)-OH or ($C_2$-$C_4$-alkylene)-$NH_2$,
provided that when the emulsifying composition contains less than 15 wt % of the first surfactant it also contains at least 60 wt % of the second surfactant and this second surfactant is obtained by reacting from 0.8 to 1.2 moles of a saturated or unsaturated $C_6$-$C_{30}$ aliphatic monocarboxylic acid, from 1 to 5 moles of ethylene oxide and from 0.8 to 1.2 moles of a hydroxyalkylamine of Formula (I).

A further object of the present invention is a method for treating a subterranean formation comprising providing a water-based subterranean treatment fluid comprising:
a) a continuous aqueous phase
b) an internal oil phase
c) from 0.1 to 15 g/100 ml, based on the total fluid volume, of an emulsifying composition comprising: i) from 1 to 40 wt % of a first surfactant having a HLB from 10 to 20 and ii) from 10 to 90% of a second surfactant obtained by reacting from 0.8 to 1.2 moles of a saturated or unsaturated $C_6$-$C_{30}$ aliphatic monocarboxylic acid, from 1 to 20 moles of ethylene oxide and from 0.8 to 1.2 moles of a hydroxyalkylamine of Formula (I)

wherein:
R is $C_2$-$C_4$-alkylene,
X and Y are selected among H, ($C_2$-$C_4$-alkylene)-OH or ($C_2$-$C_4$-alkylene)-$NH_2$,
provided that when the emulsifying composition contains less than 15 wt % of the first surfactant it also contains at least 60 wt % of the second surfactant and this second surfactant is obtained by reacting from 0.8 to 1.2 moles of a saturated or unsaturated $C_6$-$C_{30}$ aliphatic monocarboxylic acid, from 1 to 5 moles of ethylene oxide and from 0.8 to 1.2 moles of a hydroxyalkylamine of Formula (I).

In the present text, unless otherwise specified, the weight/volume ratio is expressed in gram/100 ml, equivalent to 3.5 pound/barrel (ppb).

DETAILED DESCRIPTION OF THE INVENTION

Preferably, the water-based subterranean treatment fluid of the invention comprises:
a) a continuous aqueous phase
b) an internal oil phase
c) from 1 to 10 g/100 ml, based on the total fluid volume, of an emulsifying composition comprising: i) from 1 to 40 wt % of a first surfactant having a HLB from 10 to 20 and ii) from 10 to 90% of a second surfactant obtained by reacting from 0.8 to 1.2 moles of a saturated or unsaturated $C_6$-$C_{30}$ aliphatic monocarboxylic acid, from 1 to 10 moles of ethylene oxide and from 0.8 to 1.2 moles of a hydroxyalkylamine of Formula (I)

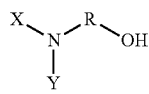

wherein:
R is $C_2$-$C_4$-alkylene,
X and Y are selected among H, $C_1$-$C_{10}$-alkyl, ($C_2$-$C_4$-alkylene)OH or ($C_2$-$C_4$-alkylene)$NH_2$,
provided that when the emulsifying composition contains less than 15 wt % of the first surfactant it also contains at least 60 wt % of the second surfactant and this second surfactant is obtained by reacting from 0.8 to 1.2 moles of a saturated or unsaturated $C_6$-$C_{30}$ aliphatic monocarboxylic acid, from 1 to 5 moles of ethylene oxide and from 0.8 to 1.2 moles of a hydroxyalkylamine of Formula (I).

Preferably, the method for treating a subterranean formation comprises providing a water-based subterranean treatment fluid that comprises:
a) a continuous aqueous phase
b) an internal oil phase
c) from 1 to 10 g/100 ml, based on the total fluid volume, of an emulsifying composition comprising: i) from 1 to 40 wt % of a first surfactant having a HLB from 10 to 20 and ii) from 10 to 90% of at least one second surfactant obtained by reacting from 0.8 to 1.2 moles of a saturated or unsaturated $C_6$-$C_{30}$ aliphatic monocarboxylic acid, from 1 to 10 moles of ethylene oxide and from 0.8 to 1.2 moles of a hydroxyalkylamine of Formula (I)

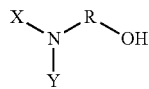

wherein:
R is $C_2$-$C_4$-alkylene,
X and Y are selected among H, $C_1$-$C_{10}$-alkyl, ($C_2$-$C_4$-alkylene)OH or ($C_2$-$C_4$-alkylene)$NH_2$,
provided that when the emulsifying composition contains less than 15 wt % of the first surfactant it also contains at least 60 wt % of the second surfactant and this second surfactant is obtained by reacting from 0.8 to 1.2 moles of a saturated or unsaturated $C_6$-$C_{30}$ aliphatic monocarboxylic acid, from 1 to 5 moles of ethylene oxide and from 0.8 to 1.2 moles of a hydroxyalkylamine of Formula (I).

The aqueous phase used in the water-based subterranean treatment fluids of the present invention can be selected among fresh water, sea water, salt water, brines (e.g., saturated salt waters), glycerine, glycols, polyglycol amines, polyols and derivatives thereof, that are partially immiscible in the oleaginous fluid, or combinations thereof.

Suitable brines may include heavy brines. Heavy brines, for the purposes of this application, include brines with various salts at variable concentrations that may be used to weight up a fluid; generally, the use of weighting agents is required to provide the desired density of the fluid. Brines generally comprise water soluble salts. Suitable water soluble salts are sodium chloride, calcium chloride, calcium bromide, zinc bromide, sodium formate, potassium formate, sodium acetate, potassium acetate, calcium acetate, ammonium acetate, ammonium chloride, ammonium bromide, sodium nitrate, potassium nitrate, ammonium nitrate, calcium nitrate, sodium carbonate, potassium carbonate, and mixtures thereof.

The aqueous phase is chosen taking into account several factors including cost, environmental and health safety profile, density, availability, and which oil phase has been chosen.

The amount of aqueous phase is from 50 to 95% by volume (vol. %), preferably from to 80 vol. %, based on the total volume of the fluid.

The oil phase used in the water-based subterranean treatment fluids of the present invention may comprise any oil-based fluid suitable for use in emulsions. The oil phase may derive from a natural or synthetic source. Examples of suitable oil phase include, without limitation, diesel oils, paraffin oils, mineral oils, low toxicity mineral oils, olefins, esters, amides, amines, synthetic oils such as polyolefins, ethers, acetals, dialkylcarbonates, hydrocarbons and combinations thereof. The preferred oil phases are paraffin oils, low toxicity mineral oils, diesel oils, mineral oils, polyolefins, olefins and mixtures thereof. Factors determining which oil phase will be used in a particular application, include but are not limited to, its cost and performance characteristics, environmental compatibility, toxicological profile and availability.

The amount of oil phase is from 5 to 50 vol. %, preferably from 20 to 50 vol. %, based on the total volume of the fluid.

The emulsifying composition of the invention comprises from 1 to 40 wt %, preferably from 5 to 30 wt % of the first surfactant.

The first surfactant of the emulsifying composition of the invention has a HLB from 10 to 20 and can be a nonionic or an anionic surfactant. The term "HLB" refers to the hydrophilic-lipophilic balance of a surfactant and it is a parameter suitable for describing the tendency of a surfactant to be hydrophilic or hydrophobic. Therefore, a surfactant having a HLB from 10 to 20 is a surfactant that shows a tendency to be hydrophilic. According to the invention, HLB can be determined by using the formula HLB=20·Mh/M where Mh is the molecular mass of the hydrophilic portion of the molecule, and M is the molecular mass of the whole molecule.

According to one preferred embodiment, said first surfactant having a HLB from 10 to 20 is a non-ionic surfactant. Suitable non-ionic surfactants include polyalkoxylated, preferably polyethoxylated, saturated and unsaturated, aliphatic alcohols, having 8 to 24 carbon atoms, deriving from the corresponding fatty acids or from petrochemical processes, and having an average degree of alkoxylation (ethoxylation) of between 1 and 100, preferably between 4 and 40; polyalkoxylated, preferably polyethoxylated, hydroxy-fatty acids or glycerides of hydroxy-fatty acids, such as, for example, polyalkoxylated castor oil, having an average degree of alkoxylation (ethoxylation) of between 10 and 80; sorbitan or sorbitol esters of fatty acids or polyalkoxylated, preferably polyethoxylated, sorbitan or sorbitol esters of fatty acids; polyalkoxylated, preferably polyethoxylated, amines; di- or tri-block copolymers from alkylene oxides, for example from ethylene oxide and propylene oxide, having average molecular weight between 200 and 8000 g/mol, preferably between 1000 and 4000 g/mol; alkylpolyglycosides or polyalkoxylated, preferably polyethoxylated, alkylpolyglycosides.

Most preferred nonionic surfactants include: polyalkoxylated, preferably polyethoxylated, saturated and unsaturated aliphatic alcohols; polyethoxylated, sorbitan or sorbitol esters of fatty acids; alkylpolyglycosides, polyalkoxylated, preferably polyethoxylated, alkylpolyglycosides, or mixtures thereof. Particularly preferred nonionic surfactants are polyethoxylated sorbitan or sorbitol esters of fatty acids having an average degree of alkoxylation (ethoxylation) of between 1 and 100, preferably between 10 and 40.

According to another embodiment, said first surfactant having a HLB from 10 to 20 is an anionic surfactant. Suitable anionic surfactants include alkali metal and alkaline earth metal salts of polyalkoxylated, preferably polyethoxylated, surfactants which are ionically modified, for example by conversion of the terminal hydroxyl function of the alkylene oxide block into a sulfate or phosphate ester in form of sodium, potassium and ammonium salts; alkali metal and alkaline earth metal salts of alkylarylsulfonic acids having a straight-chain or branched alkyl chain; alkali metal and alkaline earth metal salts of sulfate or phosphate ester of $C_8$-$C_{24}$ saturated and unsaturated aliphatic alcohols; alkali metal and alkaline earth metal salts of $C_8$-$C_{24}$ alfa-olefin sulfonate; alkali metal and alkaline earth metal salts of paraffin-sulfonic acids and chlorinated paraffin-sulfonic acids; polyelectrolytes, such as lignosulfonates, condensates of naphthalene sulfonate and formaldehyde, polystyrenesulfonates or sulfonated unsaturated or aromatic polymers; anionic esters of alkylpolyglycosides, such as for example alkylpolyglucoside sulfosuccinate or citrate; salts of sulfosuccinic acid, which are esterified once or twice with linear, or branched aliphatic, cycloaliphatic and/or aromatic alcohols, or sulfosuccinates which are esterified once or twice with (poly)alkylene oxide adducts of alcohols.

The emulsifying composition of the invention comprises from 10 to 90 wt %, preferably from 30 to 80 wt % of at least one second surfactant. According to a preferred embodiment, the second surfactant of the emulsifying composition has a HLB equal to or less than 10.

The second surfactant of the invention is obtained by reacting a saturated or unsaturated $C_6$-$C_{30}$ aliphatic monocarboxylic acid with ethylene oxide and a hydroxyalkylamine of Formula (I). The reaction process comprises two steps (ethoxylation and amidation/esterification). According to one embodiment, the hydroxyalkylamine of Formula (I) is first reacted with ethylene oxide and subsequently with the saturated or unsaturated $C_6$-$C_{30}$, preferably $C_{12}$-$C_{18}$, aliphatic monocarboxylic acid. According to another embodiment the hydroxyalkylamine of Formula (I) is first reacted with the saturated or unsaturated $C_6$-$C_{30}$, preferably $C_{12}$-$C_{18}$, aliphatic monocarboxylic acid and subsequently the amidation/esterfication product obtained in the first step is reacted with ethylene oxide.

Examples of $C_6$-$C_{30}$ aliphatic unsaturated monocarboxylic acids suitable for the present invention include both unsaturated and polyunsaturated aliphatic carboxylic acids with from 6 to 30 carbon atoms. Examples of these acids are palmitoleic acid, oleic acid, linoleic acid, linolenic acid, arachidonic acid, and the like.

Examples of $C_6$-$C_{30}$ aliphatic saturated monocarboxylic acids include decanoic acid, lauric acid, myristic acid, palmitic acid, stearic acid, behenic acid, and the like.

Mixtures of $C_6$-$C_{30}$ saturated and unsaturated aliphatic monocarboxylic acids can be also used.

Also, purified waste vegetable oils are useful sources of aliphatic monocarboxilic acids.

Mixtures of monocarboxylic acids derived from natural oils, such as coconut oil, mustard seed oil, palm oil, olefin, soy oil, canola oil, tall oil, sunflower oil and mixture thereof are preferred.

Mixtures of saturated and unsaturated aliphatic $C_6$-$C_{30}$ monocarboxylic acids obtained as by-product in the process of the biodiesel production are also suitable. According to the invention, the hydroxyalkylamine of Formula (I) is preferably selected among aminoethylethanolamine, triethanolamine, N-methyl-diethanolamine, N-ethyl-diethanolamine, N-propyl-diethanolamine, N-butyl-diethanolamine, N,N-dimethyl-ethanolamine, N,N-diethyl-ethanolamine, N,N-diisopropyl-ethanolamine, N,N-dibutyl-ethanolamine and N,N-dimethyl-isopropanolamine.

More preferably, the hydroxyalkylamine of Formula (I) is triethanolamine or aminoethylethanolamine. The sum of the first surfactant and the second surfactant constitutes at least 50% by weight of the emulsifying composition of the invention. Optionally, the emulsifying composition of the invention comprises from 0 to 35 wt % of a third surfactant other than the first surfactant and the second surfactant. Said third surfactant can be non-ionic, anionic or cationic. Preferably, said third surfactant is a non-ionic surfactant. More preferably, said third surfactant is a fatty acid ester of alkoxylated castor oil. Suitable fatty acid esters of alkoxylated castor oil are obtained by alkoxylating castor oil with from 1 to 50, preferably from 2 to 30, more preferably from 5 to 25 moles of $C_2$-$C_4$ alkylene oxide (preferably ethylene oxide) and then reacting the obtained castor oil alkoxylate with a linear or branched, saturated or unsaturated $C_6$-$C_{30}$, preferably $C_{10}$-$C_{22}$, more preferably $C_{16}$-$C_{20}$ fatty acid. Most preferably, said third surfactant is a monoester or diester of oleic acid with castor oil ethoxylated with from 5 to 25 moles of ethylene oxide.

The emulsifying composition of the invention can contain from 0 to 30 wt % of water.

The water-base subterranean treatment fluids of the invention may further comprise conventional additives including weighting agents, wetting agents, fluid loss agents, thickeners, thinning agents, lubricants, shale stabilizers, anti-oxidants, corrosion inhibitors, scale inhibitors, defoamers, biocides, pH modifiers, and the like.

The water-based subterranean treatment fluids of the invention may be suitable for use in a variety of subterranean applications wherein oil-in-water emulsions are used; these applications include drilling, completion, stimulation operations (such as fracturing) and work-over, sand control treatments such as installing a gravel pack, spotting, cementing, maintenance and reactivation.

To better illustrate the invention, the following examples are reported to show the effect of the emulsifying composition of the invention in water-based drilling fluids.

EXAMPLES

Preparation of the Emulsifying Compositions
Surfactants used to prepare the emulsifying compositions:
A) Sorbilene O, ethoxylated sorbitan monooleate, commercially available from Lamberti S.p.A. (HLB: 15);
B) Emulson AG 18/C, ethoxylated castor oil oleate, commercially available from Lamberti S.p.A.;
C) Ethoxylated (with 3 moles of ethylene oxide) esteramine obtained by reacting 2 moles of fatty acids from coconut oil and 1 mole of triethanolamine;
D) Ethoxylated (with 3 moles of ethylene oxide) esteramine obtained by reacting 1 mole of fatty acids from coconut oil and 1 mole of triethanola mine;
E) Ethoxylated (with 3 moles of ethylene oxide) esteramine obtained by reacting 1 mole of tall oil and 1 mole of triethanolamine;
F) Ethoxylated (with 4 moles of ethylene oxide) esteramine obtained by reacting 1 mole of tall oil and 1 mole of aminoethylethanolamine;
G) Ethoxylated (with 6 moles of ethylene oxide) esteramine obtained by reacting 1 mole of tall oil and 1 mole of aminoethylethanolamine.

Said surfactants were used to prepare the emulsifying compositions 1-17 listed in Table 1. The amounts are reported as wt %.

The emulsifying performances of the emulsifying compositions 1-17 were evaluated on a fluid system obtained by mixing 105.00 ml of Diesel and 245.00 ml of brine. Each emulsifying composition was dosed at 2.67 g/100 ml. In particular the emulsion stability was evaluated after hot rolling for 16 hours at 65° C. (150° F.) and, subsequently, after steady aging for 5 days at 65° C. (150° F.), according to ISO 10416, par. 26.8. The determination conditions are described in ISO 10416, par. 26.10. Emulsions which showed no or negligible phase separation after both hot rolling and steady aging were considered stable. Also the results of the emulsion stability tests are reported in Table 1.

The results reported in Table 1 show the synergistic effect deriving from the combination of the surfactants of the inventive emulsifying compositions.

TABLE 1

| Examples | A | B | C | D | E | F | G | Water | Emulsion stability |
|---|---|---|---|---|---|---|---|---|---|
| 1 | 20 | 30 | | | 40 | | | 10 | Stable |
| 2 | 20 | | | | 50 | 20 | | 10 | Stable |
| 3* | 10 | | 50 | | | 20 | | 20 | Separation after steady aging |
| 4* | 10 | 50 | | | | 20 | | 20 | Separation after hot rolling |
| 5 | 10 | | 50 | 20 | | | | 20 | Stable |
| 6* | 10 | 20 | 50 | | | | | 20 | Separation after hot rolling |
| 7 | 10 | | | 20 | 50 | | | 20 | Stable |
| 8* | 10 | 20 | | | 50 | | | 20 | Separation after hot rolling |
| 9* | | 50 | | | | 50 | | | Separation after steady aging |
| 10* | | | | | | 100 | | | Separation after steady aging |
| 11* | | | | 50 | | 50 | | | Separation after steady aging |
| 12* | 100 | | | | | | | | Separation after hot rolling |
| 13* | | | 100 | | | | | | Separation after steady aging |
| 14* | | | | 100 | | | | | Separation after hot rolling |
| 15 | 20 | | | | 80 | | | | Stable |
| 16* | 50 | | | | 50 | | | | Separation after hot rolling |
| 17 | 20 | | | | 80 | | | | Stable |

*Comparative

The emulsifying compositions 1, 2, 5 and 7, which all were suitable to prepare stable oil in water emulsions, were used to prepare water-based drilling muds.

350 ml of water-based drilling mud were prepared by means of a Hamilton Beach Mixer according to the formulations described in Table 2.

For the evaluation of the muds (see Table 3), rheological properties and electrical stability were determined after hot rolling for 16 hours at 65° C. (150° F.) and after steady aging for 5 days at 65° C. (150° F.) according to 15010416, par. 26.8 and 26.9.

The determination conditions are described in 15010416 par. 26.10.

The muds prepared with the emulsifying compositions of the invention showed good rheological characteristics, also after the thermal treatment.

TABLE 2

| Ingredient | Unit of measurement | MUD 1 | MUD 2 | MUD 3 | MUD 4 |
|---|---|---|---|---|---|
| Yellow Diesel | ml | 105.00 | 105.00 | 105.00 | 105.00 |
| Example 1 | g | 8.00 | | | |
| Example 2 | g | | 8.00 | | |
| Example 5 | g | | | 8.00 | |
| Example 7 | g | | | | 8.00 |
| Brine | ml | 245.00 | 245.00 | 245.00 | 245.00 |
| Lime | g | 0.50 | 0.50 | 0.50 | 0.50 |
| Starch | g | 6.00 | 6.00 | 6.00 | 6.00 |
| Carboxymethyl cellulose | g | 2.00 | 2.00 | 2.00 | 2.00 |
| Xanthan gum | g | 0.50 | 0.50 | 0.50 | 0.50 |
| $CaCO_3$ | g | 5.00 | 5.00 | 5.00 | 5.00 |

TABLE 3

| Parameter | Unit of measurement | MUD 1 | | MUD 2 | | MUD 3 | | MUD 4 | |
|---|---|---|---|---|---|---|---|---|---|
| | | AHR | ASA | AHR | ASA | AHR | ASA | AHR | ASA |
| Rheology 600 rpm | lb/100 ft$^2$* | 94 | 109 | 105 | 79 | 80 | 62 | 125 | 109 |
| 300 rpm | lb/100 ft$^2$* | 57 | 62 | 66 | 50 | 46 | 39 | 75 | 65 |
| 200 rpm | lb/100 ft$^2$* | 41 | 45 | 49 | 40 | 35 | 29 | 54 | 50 |
| 100 rpm | lb/100 ft$^2$* | 25 | 26 | 30 | 25 | 20 | 18 | 31 | 28 |
| 6 rpm | lb/100 ft$^2$* | 3 | 4 | 4 | 4 | 3 | 3 | 4 | 3 |
| 3 rpm | lb/100 ft$^2$* | 2 | 3 | 3 | 3 | 2 | 2 | 3 | 2 |
| PV | mPa | 37 | 47 | 39 | 29 | 34 | 23 | 50 | 44 |

TABLE 3-continued

| Parameter | Unit of measurement | MUD 1 AHR | MUD 1 ASA | MUD 2 AHR | MUD 2 ASA | MUD 3 AHR | MUD 3 ASA | MUD 4 AHR | MUD 4 ASA |
|---|---|---|---|---|---|---|---|---|---|
| YP | lb/100 ft²* | 20 | 15 | 27 | 21 | 12 | 16 | 25 | 21 |
| ES | Volts | 16 | 6 | 61 | 35 | 1 | 7 | 49 | 8 |

*1 lb/100ft2 = 0.479 Pa
AHR = after hot rolling
ASA = after steady aging

The invention claimed is:

1. A water-based subterranean treatment fluid, comprising:
   a) a continuous aqueous phase
   b) an internal oil phase
   c) from 0.1 to 15 g/100 ml, based on the total fluid volume, of an emulsifying composition comprising: i) from 1 to 40 wt % of a first surfactant having a HLB from 10 to 20 and ii) from 10 to 90% of at least one second surfactant obtained by reacting from 0.8 to 1.2 moles of a saturated or unsaturated C6-C30 aliphatic monocarboxylic acid, from 1 to 20 moles of ethylene oxide and from 0.8 to 1.2 moles of a hydroxyalkylamine of Formula (I)

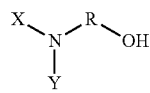
(I)

wherein:
R is $C_2$-$C_4$-alkylene,
X and Y are selected among H, $C_1$-$C_{10}$-alkyl, ($C_2$-$C_4$-alkylene)OH or ($C_2$-$C_4$-alkylene)NH$_2$,
provided that when the emulsifying composition contains less than 15 wt % of the first surfactant it also contains at least 60 wt % of the second surfactant and this second surfactant is obtained by reacting from 0.8 to 1.2 moles of a saturated or unsaturated $C_6$-$C_{30}$ aliphatic monocarboxylic acid, from 1 to 5 moles of ethylene oxide and from 0.8 to 1.2 moles of a hydroxyalkylamine of Formula (I).

2. A water-based subterranean treatment fluid according to claim 1, wherein the hydroxyalkylamine of Formula (I) is triethanolamine or a monoethylethanolamine.

3. A water-based subterranean treatment fluid according to claim 1, wherein the second surfactant is obtained by reacting from 0.8 to 1.2 moles of a saturated or unsaturated $C_6$-$C_{30}$ aliphatic monocarboxylic acid, from 1 to 10 moles of ethylene oxide and from 0.8 to 1.2 moles of a hydroxyalkylamine of Formula (I).

4. A water-based subterranean treatment fluid according to claim 1, wherein the saturated or unsaturated $C_6$-$C_{30}$ aliphatic monocarboxylic acid is a saturated or unsaturated $C_{12}$-$C_{18}$ aliphatic monocarboxylic acid.

5. A water-based subterranean treatment fluid according to claim 1, wherein the first surfactant is a polyethoxylated sorbitan or sorbitol ester of fatty acids.

6. A water-based subterranean treatment fluid according to claim 1, wherein the emulsifying composition comprises from 0 to 40 wt % of a third surfactant.

7. A water-based subterranean treatment fluid according to claim 1, wherein the emulsifying composition comprises from 0 to 40 wt % of a third surfactant, which is a fatty acid ester of alkoxylated castor oil.

8. A method for treating a subterranean formation comprising providing a water-based subterranean treatment fluid comprising:
   a) a continuous aqueous phase
   b) an internal oil phase
   c) from 0.1 to 15 g/100 ml, based on the total fluid volume, of an emulsifying composition comprising: i) from 1 to 40 wt % of a first surfactant having a HLB from 10 to 20 and ii) from 10 to 90% of at least one second surfactant obtained by reacting from 0.8 to 1.2 moles of a saturated or unsaturated $C_6$-$C_{30}$ aliphatic monocarboxylic acid, from 1 to 20 moles of ethylene oxide and from 0.8 to 1.2 moles of a hydroxyalkylamine of Formula (I)

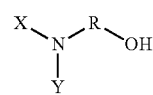
(I)

wherein:
R is $C_2$-$C_4$-alkylene,
X and Y are selected among H, $C_1$-$C_{10}$-alkyl, ($C_2$-$C_4$-alkylene)OH or ($C_2$-$C_4$-alkylene)NH$_2$,
provided that when the emulsifying composition contains less than 15 wt % of the first surfactant it also contains at least 60 wt % of the second surfactant and this second surfactant is obtained by reacting from 0.8 to 1.2 moles of a saturated or unsaturated $C_6$-$C_{30}$ aliphatic monocarboxylic acid, from 1 to 5 moles of ethylene oxide and from 0.8 to 1.2 moles of a hydroxyalkylamine of Formula (I).

* * * * *